US008953907B2

(12) United States Patent
Keithley

(10) Patent No.: US 8,953,907 B2
(45) Date of Patent: Feb. 10, 2015

(54) MODIFIED BICUBIC INTERPOLATION

(75) Inventor: Douglas G. Keithley, Boise, ID (US)

(73) Assignee: Marvell World Trade Ltd. (BB)

( * ) Notice: Subject to any disclaimer, the term of this patent is extended or adjusted under 35 U.S.C. 154(b) by 83 days.

(21) Appl. No.: 13/473,753

(22) Filed: May 17, 2012

(65) Prior Publication Data

US 2012/0321219 A1  Dec. 20, 2012

Related U.S. Application Data

(60) Provisional application No. 61/497,212, filed on Jun. 15, 2011.

(51) Int. Cl.
    *G06K 9/32*     (2006.01)
    *G06T 3/40*     (2006.01)

(52) U.S. Cl.
    CPC ............................ *G06T 3/403* (2013.01)
    USPC .......................................... 382/300

(58) Field of Classification Search
    None
    See application file for complete search history.

(56) References Cited

U.S. PATENT DOCUMENTS

| | | | | |
|---|---|---|---|---|
| 4,884,971 A | * | 12/1989 | Chan et al. | 434/2 |
| 5,257,355 A | * | 10/1993 | Akamatsu | 345/442 |
| 5,880,767 A | * | 3/1999 | Liu | 347/251 |
| 5,995,682 A | * | 11/1999 | Pawlicki et al. | 382/300 |
| 6,618,443 B1 | * | 9/2003 | Kim et al. | 375/240.21 |
| 6,687,417 B1 | * | 2/2004 | Bradley et al. | 382/279 |
| 7,088,457 B1 | * | 8/2006 | Zou et al. | 356/512 |
| 2003/0081225 A1 | * | 5/2003 | Nakami et al. | 358/1.2 |
| 2003/0184566 A1 | * | 10/2003 | Cheng | 345/660 |

(Continued)

FOREIGN PATENT DOCUMENTS

| | | |
|---|---|---|
| EP | 1480166 A1 | 11/2004 |
| WO | 02/27657 A2 | 4/2002 |

OTHER PUBLICATIONS

Patent Cooperation Treaty (PCT) International Search Report and Written Opinion in co-pending PCT International Patent Application No. PCT/US2012/038255 (International Filing Date: May 17, 2012) having a Date of Mailing of Jul. 25, 2012 (10 pgs).

(Continued)

*Primary Examiner* — Bhavesh Mehta
*Assistant Examiner* — Feng Niu

(57) ABSTRACT

Systems, methods, and other embodiments associated with image scaling are described. According to one embodiment, a method acquiring a set of amplitude values describing pixels in an image. Image scaling is performed on the image. A target pixel is identified from the set of pixels. A preceding pixel is identified to the target pixel. An amplitude range of amplitudes is defined between the amplitude of the preceding pixel and the target pixel. It is determined whether the interpolation between the preceding pixel and target pixel will result in an interpolated pixel having an interpolated amplitude outside of the amplitude range. Based on this determination, an interpolation slope is selected that reduces overshoot or undershoot in interpolation pixels generated between the target pixel and the preceding pixel.

20 Claims, 5 Drawing Sheets

(56) References Cited

U.S. PATENT DOCUMENTS

| | | | |
|---|---|---|---|
| 2003/0187613 A1* | 10/2003 | Cheng | 702/179 |
| 2003/0189579 A1 | 10/2003 | Pope | |
| 2004/0207758 A1* | 10/2004 | Sai et al. | 348/627 |
| 2005/0100246 A1* | 5/2005 | Lee | 382/300 |
| 2006/0192897 A1* | 8/2006 | Morphet | 348/625 |
| 2009/0324136 A1* | 12/2009 | Yamada et al. | 382/300 |
| 2010/0156772 A1* | 6/2010 | Arashima et al. | 345/87 |
| 2010/0165204 A1 | 7/2010 | Huang et al. | |
| 2010/0322536 A1* | 12/2010 | Tezuka | 382/300 |

OTHER PUBLICATIONS

Allebach, J. et al.: "Edge-Directed Interpolation," Proceedings of the International Conference on Image Processing (ICIP) Lausanee, Sep. 16-19, 1996, New York, IEEE, US, Sep. 16, 1996 (4 pgs).

Lehmann T M et al.: "Survey: Interpolation Methods in Medical Image Processing," IEEE Transactions on Medical Imaging, IEEE Service Center, Piscataway, NJ Nov. 1, 1999 (27 pgs).

* cited by examiner

MODIFIED BICUBIC INTERPOLATION

CROSS REFERENCE TO RELATED APPLICATIONS

This patent disclosure claims the benefit of U.S. Provisional Application No. 61/497,212 filed on Jun. 15, 2011, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In computer graphics, image scaling is the process of resizing a pixelated digital image. Scaling up involves adding additional pixels between the existing pixels to enlarge the image. However, two adjacent existing pixels may have different characteristics. The characteristics of the additional pixels should gradually vary to make the transition between existing pixels appear continuous.

Scaling up an image using bilinear interpolation provides a smooth transition in the image. However, bilinear interpolation makes edges look blurry. Moreover, to enlarge the digital image bilinear interpolation generates a curve that does not have a continuous derivative, meaning the scaling has abrupt changes in slope. The abrupt changes in slope cause the digital image to appear disjointed.

Scaling up using bicubic interpolation has sharper transitions so there is less blurring in a digital image than with bilinear interpolation. Bicubic interpolation generates a curve with a continuous derivative, but causes 'sharpening-like' overshoot and undershoot along the edges of transitions in the digital image. Overshoot and undershoot cause interpolated pixel color intensity to exceed the color intensity of the existing pixels. Thus, overshoot and undershoot may make portions of the digital image appear arbitrarily brighter or darker.

SUMMARY

In one embodiment a method includes acquiring a set of amplitude values describing pixels in an image. Image scaling is performed on the image. A target pixel is identified from the set of pixels. A preceding pixel is identified to the target pixel. An amplitude range is defined between the amplitudes of the preceding pixel and the target pixel. It is determined whether the interpolation between the preceding pixel and target pixel will result in an interpolated pixel having an interpolated amplitude outside of the amplitude range.

In one embodiment, when the interpolated amplitude is outside of the amplitude range, a set of interpolated pixels is generated between the preceding pixel and the target pixel. A curve defining amplitudes of the set of interpolated pixels has an interpolation slope set to substantially zero at the target pixel.

In one embodiment an apparatus includes an acquisition logic configured to acquire a set of amplitude values describing pixels in an image. The apparatus also includes a scaling logic configured to perform image scaling on the image. The scaling logic includes an overshoot logic configured to identify a target pixel and a preceding pixel. The scaling logic is also configured to determine if interpolation between the preceding pixel and target pixel will result in an interpolated pixel having an interpolated amplitude outside of an amplitude range between the preceding pixel and the target pixel. The scaling logic also includes a slope selection logic configured to select an interpolation slope for a curve that defines amplitudes of a set of interpolated pixels. The scaling logic also includes a rendering logic configured to render the set of interpolated pixels between the preceding pixel and the target pixel using the interpolation slope.

In one embodiment a method includes identifying a target pixel in an image to be scaled. The method further includes identifying a preceding pixel to the target pixel and identifying a following pixel to the target pixel. A first slope is determined between the preceding pixel and the target pixel. A second slope is determined between the target pixel and the following pixel. An interpolation curve is defined having the interpolation slope. A set of interpolated pixels is generated between the preceding pixel and the following pixel along the interpolation curve.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are examples of systems, methods, and other embodiments associated with scaling up digital images using modified bicubic interpolation that provides the sharper image edges of bicubic interpolation while reducing overshoot and undershoot usually associated with bicubic interpolation. Bicubic interpolation is accomplished by performing cubic interpolation in two different dimensions. For simplicity, modified cubic interpolation techniques will be described herein. When performed in two dimensions, the modified cubic interpolation techniques will result in modified bicubic interpolation. Rather than automatically using a standard cubic slope, the modified cubic interpolation technique generates a modified cubic interpolation curve with a modified interpolation slope selected to minimize overshoot.

Modified bicubic interpolation performs a gradual visual shift from one target pixel to an adjacent pixel.

Figure 1:
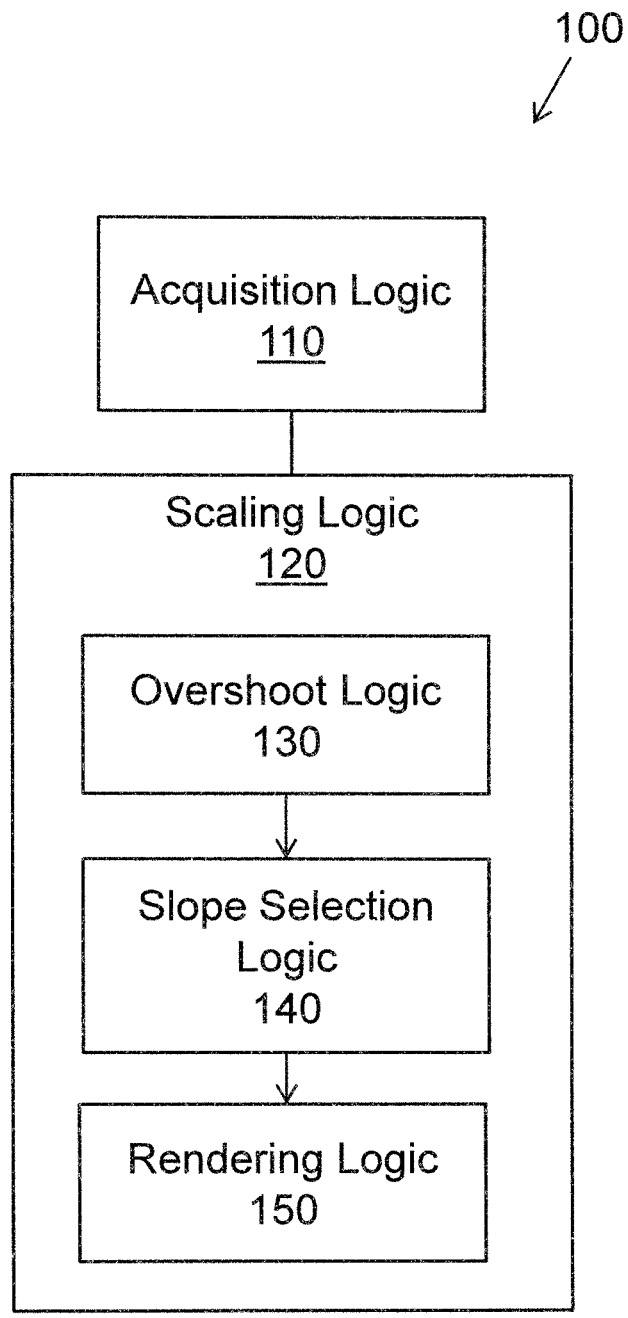
FIG. 1 illustrates one embodiment of an apparatus associated with interpolation having reduced overshoot and undershoot.

With reference to FIG. 1, one embodiment of an apparatus 100 is shown that is associated with image scaling. The apparatus 100 may be implemented in a device for enlarging digital images. The apparatus 100 includes an acquisition logic 110 and a scaling logic 120. The acquisition logic 110 is configured to receive amplitude values that describe pixels in the digital image. The amplitude values are used by the scaling logic 120 to enlarge an image by adding interpolated pixels between the existing pixels in the image. These additional interpolated pixels have amplitudes fitted along a modified cubic interpolation curve. The modified cubic interpolation curve reduces overshoot or undershoot.

Interpolated pixels are generated between a selected target pixel and a preceding pixel (e.g., an adjacent pixel that precedes the target pixel in the digital image.) Overshoot and undershoot occur when the amplitude of an interpolated pixel falls outside the range between the amplitudes of the target pixel and the preceding pixel. Overshoot occurs when an interpolated pixel has an amplitude that is more positive than the amplitude of either the preceding pixel or the target pixel. Undershoot occurs when an interpolated pixel has an amplitude less positive than the amplitude of either the preceding pixel or the target pixel. For the purposes of the description, either overshoot or undershoot is referred to as appropriate, but it is to be understood that techniques that minimize overshoot also minimize undershoot and vice versa.

The amplitude values received by acquisition logic 110 describe pixels in the digital image. The amplitude values correspond to characteristics (e.g., color intensity values) of the pixels. The amplitude values are used by the scaling logic 120 to scale up the image. The scaling logic 120 includes an overshoot logic 130, a slope selection logic 140, and a rendering logic 150.

The overshoot logic 130 is configured to determine if interpolated pixels will be subject to overshoot if standard cubic interpolation is used. Overshoot and undershoot typically occur in standard cubic interpolation when a target pixel is a relative minimum or maximum. To determine if the target pixel is a relative minimum or maximum, the overshoot logic 130 identifies an adjacent preceding pixel to the target pixel and an adjacent following pixel to the target pixel. The overshoot logic 130 compares the signs of slope values calculated between the target pixel and the adjacent pixels. A first slope, SL, is defined as the slope between a preceding pixel and the target pixel. A second slope, SR, is defined as the slope between the target pixel and the following pixel. If the first slope and the second slope have different signs, the overshoot logic 130 determines that the target pixel is a relative maxima or minima, which would cause overshoot or undershoot.

The slope selection logic 140 selects a modified interpolation slope that is used in the calculation of a modified cubic interpolation curve. Conventionally, the standard cubic scaling uses the standard cubic slope: $(P(x+1)-P(x-1))/2$ where $P(x)$ is the amplitude of the pixel in column x, x−1 identifies a pixel to the left of the pixel in column x, and x+1 identifies a pixel to the right of the pixel in column x. Modified cubic interpolation determines the position of the target pixel relative to its neighboring preceding pixel and following pixel, to select a modified interpolation slope specifically suited to the target pixel.

The modified interpolation slope will be set to one of:
0 if SL and SR have opposite signs;
min $\{(SL+SR)/2); (SF*SL); (SF*SR)\}$ if SL and SR are positive, where SF is a scaling factor; and
max $\{(SL(x)+SR(x))/2); (SF*SL(x)); (SF*SR(x))\}$ if SL and SR are negative, where SF is a scaling factor.

The modified interpolation slope is selected to limit the angle of rise of the modified cubic interpolation curve at the target pixel to minimize the occurrence of overshoot and undershoot. If the overshoot logic 130 determines the target pixel is a relative maxima or minima, the slope selection logic 140 sets the modified interpolation slope to zero. Accordingly, the modified interpolation slope acts as a line with a slope of zero that passes through the target pixel. This line is treated as a tangential line by the modified cubic interpolation curve. In one embodiment, the modified cubic interpolation curve approaches the slope zero line at the target pixel but does not cross it. Alternatively, the modified cubic interpolation curve uses the slope zero line as an indicator to approach the following pixel.

When the overshoot logic 130 determines that the target pixel is not a relative maxima or minima, the overshoot logic 130 selects one of three slopes. The three slopes are: a scaled version of the first slope, a scaled version of the second slope, or a standard cubic slope which corresponds to the average of the first slope and the second slope. In one embodiment, the slope selection logic 140 selects one of the three slopes based on relative magnitudes of the first slope and the second slope. In one embodiment, if the first slope is positive and the second slope is positive, the slope selection logic 140 selects the smallest of the three slopes as the modified interpolation slope. By selecting the smallest of the three slopes, the modified interpolation slope avoids a rapid rise in the modified cubic interpolation curve that causes the modified cubic interpolation curve to overshoot the target pixel. In one embodiment, if the first slope is negative and the second slope is negative, the slope selection logic 140 uses the smallest of the three slopes as the modified interpolation slope.

The scaling factor is applied to the first and second slopes to mitigate sharpness in the modified cubic interpolation curve that will degrade the enlarged image and provides continuity. The scale factor may be a predetermined scalar that is applied by the slope selection logic 140 to first and second slopes. In one embodiment, the scale factor is greater than or equal to one. The scale factor can be programmable by a user. By scaling the first and second slope, the interpolated pixels on the modified cubic interpolation curve have a more gradual transition between amplitude values.

In addition to determining an interpolation slope for the target pixel, the scaling logic 120 is configured to determine a interpolation slope for the following pixel. This second interpolation slope is determined in a subsequent iteration of modified cubic interpolation. In the subsequent iteration, the following pixel is selected as the new target pixel and the "old" target pixel (i.e., from the preceding iteration) becomes the new preceding pixel. A new following pixel is selected with respect to the new target pixel. Note that the slope SL, one of the slopes from which the second interpolation slope is selected, has already been calculated in the prior iteration. When the second interpolation slope at the new target pixel has been selected, a curve can be generated between the old target pixel and the new target pixel using the determined slopes. This process continues sequentially until all pixels in the digital image have been processed as target pixels.

The rendering logic 150 is configured to generate the modified cubic interpolation curve at the target pixel using the selected interpolation slope, at the following pixel using the selected second interpolation slope, and so on. The modified cubic interpolation curve is populated with interpolated pixels. Thus, the interpolation pixels generated along the modified cubic interpolation curve have minimized overshoot and undershoot, causing the enlarged image to have smoother transitions between pixels and less discernible discontinuities. The remainder of this description will focus on a single iteration of modified cubic interpolation. Subsequent iterations may be performed to process additional pixels in the digital image.

Figure 2:
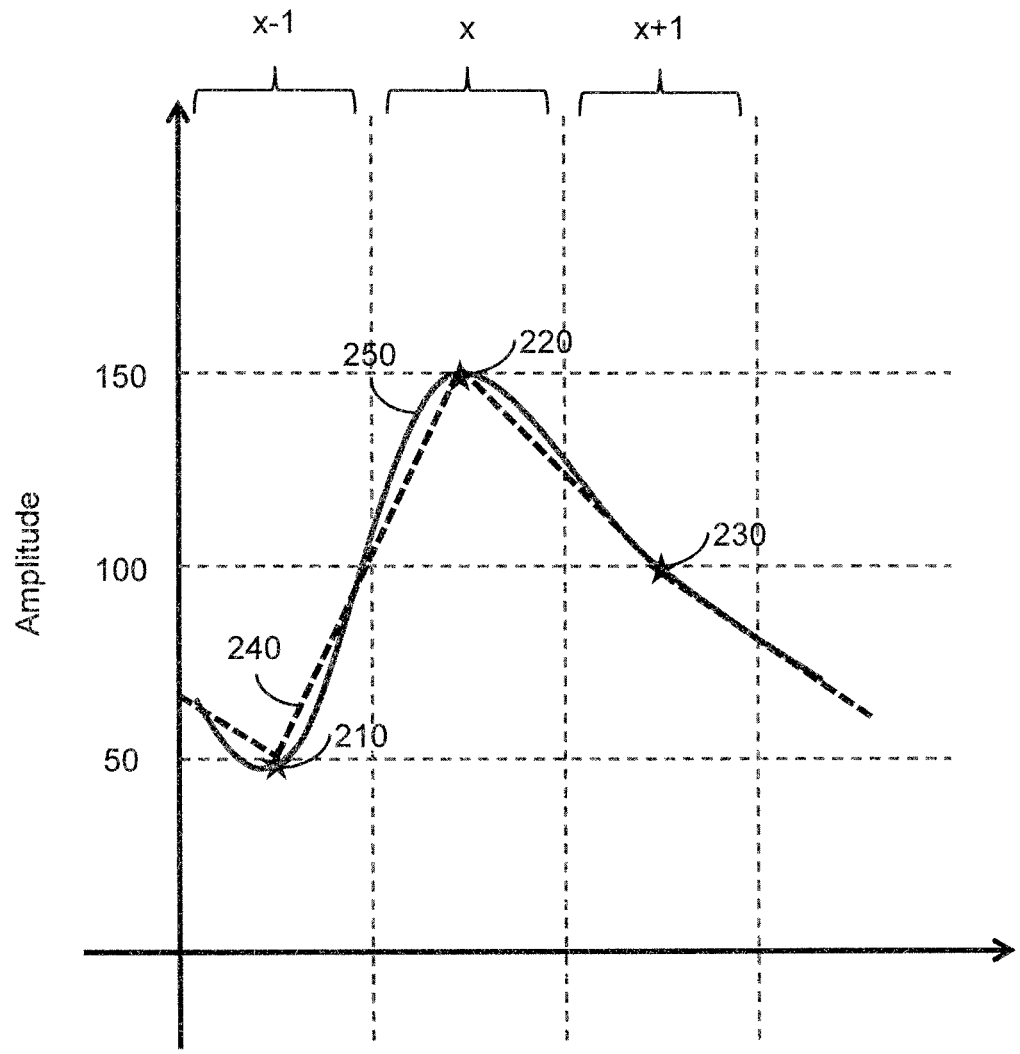
FIG. 2 illustrates a linear curve compared to a cubic curve having reduced overshoot and undershoot.

FIG. 2 illustrates a standard linear curve 240 in dotted line compared to a modified cubic interpolation curve 250 in solid line. Pixels 210, 220, and 230 correspond to existing pixels in a digital image. The pixel 210 is a preceding pixel to the target pixel 220; the pixel 230 is a following pixel to the target pixel 220. The preceding pixel 210 has an amplitude of 50, the target pixel 220 has an amplitude of 150, and the following pixel 230 has an amplitude of 100. The standard linear curve 240 interpolates additional pixels between the preceding pixel 210, the target pixel 220, and the following pixel 230. The standard linear curve 240 takes the shortest path from the preceding pixel 210 to the target pixel 220 to the following pixel 230 with abrupt changes in slope that causes the derivative of the standard linear curve 240 to be discontinuous. The discontinuous nature of the standard linear curve 240 cause the digital image to appear disjointed.

The modified cubic interpolation curve 250 interpolates additional pixels between the preceding pixel 210, the target pixel 220, and the following pixel 230 has a continuous derivative to make the transition between the pixels 210, 220, and 230 appear smooth. Overshoot and undershoot may occur but are minimized as compared to the overshoot and undershoot typical of a standard cubic curve.

The modified cubic interpolation curve 250 is calculated using the selected slope between the preceding pixel 210, the target pixel 220, and the following pixel 230. Slope calculations are defined as "rise over run" meaning the vertical distance between two existing pixels divided by the horizontal distance between the two existing pixels. In one embodiment, the horizontal distance between existing pixels, is defined as being equal to one. Accordingly, the vertical change between pixels corresponds to the slope between the pixels. In image scaling, existing pixels, such as preceding pixel 210, target pixel 220, and following pixel 230 are equidistant so slopes can be compared based on the difference in amplitude between pixels. The straightforward nature of the equations reduces the impact on the implementation and performance. In one embodiment, a slope left (SL) is calculated between a preceding adjacent pixel and a target pixel according to:

$$SL=P(x)-P(x-1) \qquad (Eq. 1)$$

where:
 for a pixel in column x, P(x) returns the amplitude of the pixel in column x, and
 for a pixel in column x−1, P(x−1) returns the amplitude of the pixel in column x−1.

Columns x−1, x, and x+1 are defined as containing a single pixel value. For example, the target pixel 220 is located in column x. To the left of the target pixel 220 is preceding adjacent pixel 210 in column x−1. According to Equation 1, the SL between target pixel 220 and preceding pixel 210 is given by SL=P(x)−P(x−1)=150−50=100. Thus, SL is identified as a positive slope.

The slope right (SR) is calculated between the target pixel 220 and the following adjacent pixel 230 according to:

$$SR=P(x+1)-P(x) \qquad (Eq. 2)$$

where:
 for a pixel in column x+1, P(x+1) returns the amplitude of the pixel in column x+1, and
 for a pixel in column x, P(x) returns the amplitude of the pixel in column x.

For example, the target pixel 220 is located in column x. To the right of the target pixel 220 is following pixel 230 in column x+1. According to Equation 2, the SR between the following pixel 230 and the target pixel 220 is given by: SR=P(x+1)−P(x)=100−150=−50. Thus, the SR is identified as a negative slope. Since SL and SR have opposite signs, the target pixel 220 is a relative maxima or minima. Thus, the slope of modified cubic interpolation curve 250 is set to zero at the target pixel 220.

Figure 3A:
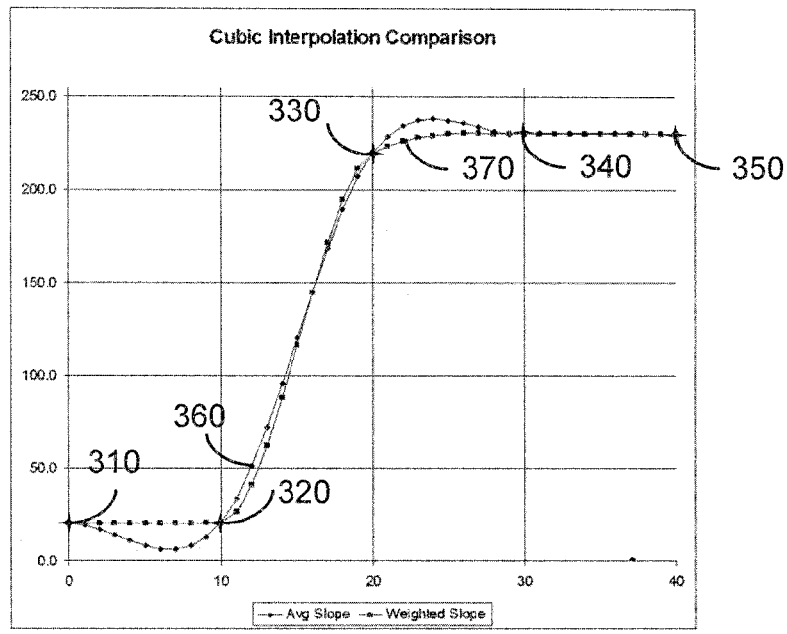
FIG. 3A illustrates a standard cubic curve compared to a modified cubic interpolation curve having reduced overshoot and undershoot.

FIG. 3A illustrates a standard cubic curve 360 compared to a modified cubic interpolation curve 370. Pixels 310, 320, 330, 340, and 350 correspond to existing pixels in a digital image. Each pixel has an amplitude representing a color intensity value. The pixel 310 has an amplitude of 20, the pixel 320 has an amplitude of 21, the pixel 330 has an amplitude of 220, the pixel 340 has an amplitude of 230, and the pixel 350 has an amplitude of 230.

The standard cubic curve 360 interpolates additional pixels between the points 310, 320, 330, 340, and 350. The amplitudes of the additional pixels are established by the standard cubic curve 360. However, standard cubic interpolation results in undershoot and overshoot. For example, the slope of the standard cubic curve 360 decreases after the pixel 310 forming a dip or undershoot between the pixel 310 and the pixel 320. The standard cubic curve 360 is also subject to overshoot between the pixel 330 and the pixel 340.

The modified cubic interpolation curve 370 interpolates pixels between the existing pixels 310, 320, 330, 340, and 350. The amplitudes of the additional pixels generated by the modified cubic interpolation curve 370 exhibit minimized undershoot and overshoot. For example, the modified cubic interpolation curve 370 does not exhibit the undershoot of standard cubic curve 360 between pixel 310 and pixel 320 or the overshoot of standard cubic curve 360 between pixel 330 and pixel 340.

To determine the slope of modified cubic interpolation curve 370, assume that 330 is a target pixel making 320 the preceding pixel and 340 the following pixel. Thus, SL and SR are both positive slopes. Because both slopes are positive the modified interpolation slope is whichever is the smallest of SL, SR, and standard bicubic slope.

Figure 3B:
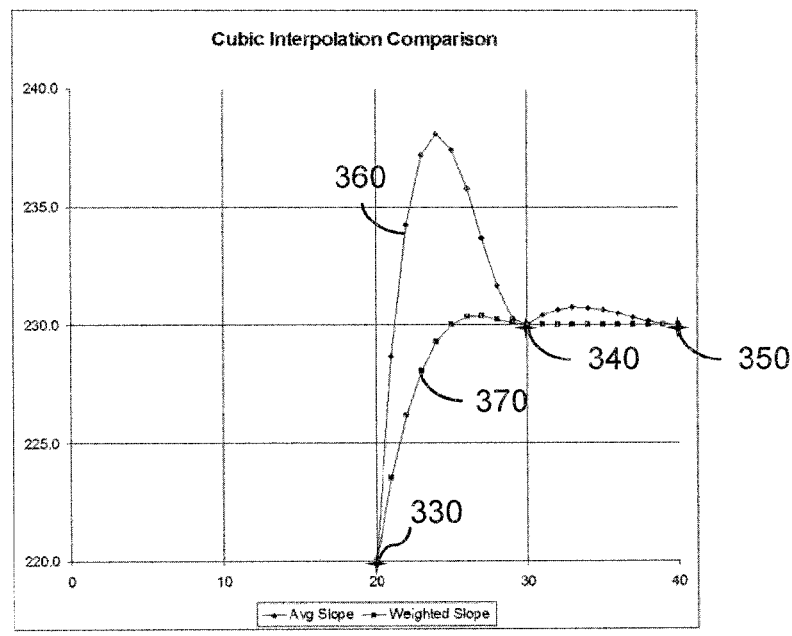
FIG. 3B illustrates a standard cubic curve compared to a modified cubic interpolation curve having reduced overshoot and undershoot.

FIG. 3B illustrates a close up view of the standard cubic curve 360 compared to the interpolation curve 370 shown in FIG. 3A. The standard cubic curve 360 and the modified cubic interpolation curve 370 are shown in greater detail between the pixels 330 and 350. The standard cubic curve 360 rises from pixel 330 and overshoots the amplitudes of pixel 340. Pixel 330 has an amplitude of 220. Rather than rising to the pixel 340 that has an amplitude of 230, the standard cubic curve 360 rises to a peak amplitude of 238 which is nearly twice the difference between the amplitude of the pixel 330 and the pixel 340. From that peak, the standard cubic curve 360 falls to the pixel 340. The peak constitutes significant overshoot. The overshoot occurs again between the pixels 340 and 350 even though the pixels 340 and 350 have the same amplitude.

The modified cubic interpolation curve 370 does not suffer from the significant overshoot that the standard cubic curve 360 does. Between pixel 330 and 340 the amplitude of the modified cubic interpolation curve 370 rises to an amplitude of 231. The rise in the modified cubic interpolation curve 370 over pixel 340 ensures that the modified cubic interpolation curve 370 is continuous, but does not suffer from the overshoot that the standard cubic curve 360 does. In one embodiment, if overshoot, such as the overshoot between pixels 340 and 350 is desired, the standard bicubic slope can be selected to generate the modified cubic interpolation curve 370. The techniques used to generate the interpolation curve 370 reduce overshoot and undershoot typical of bicubic interpolation.

Figure 4:
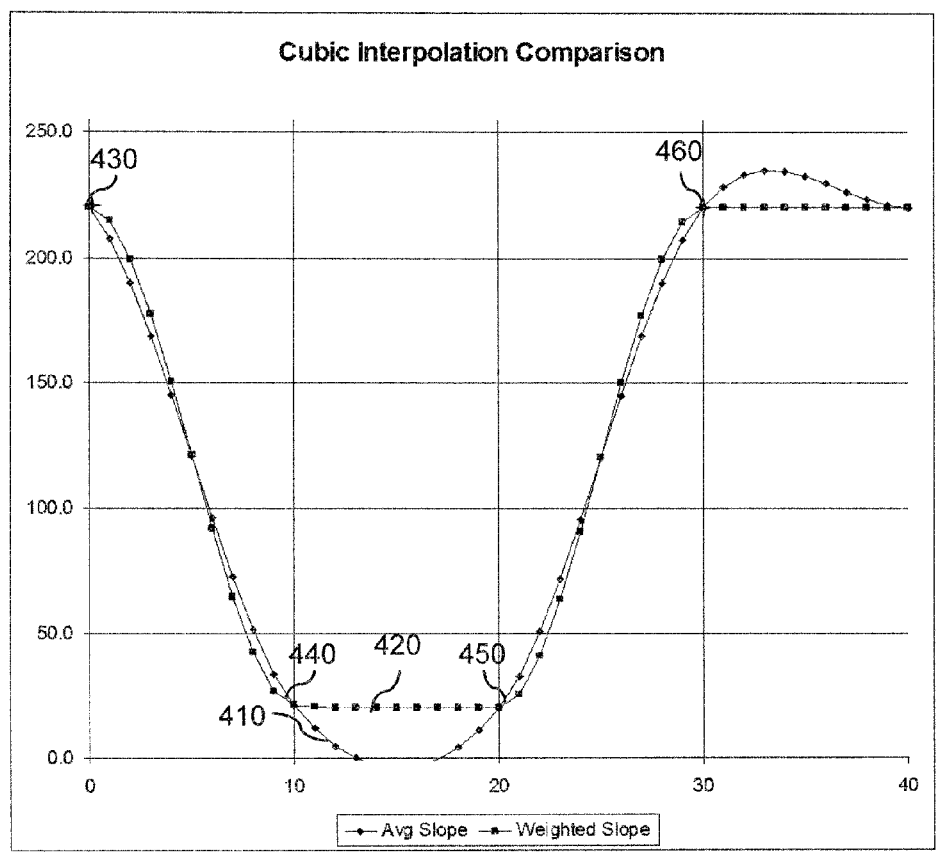
FIG. 4 illustrates a standard cubic curve compared to a modified cubic interpolation curve having reduced overshoot and undershoot.

FIG. 4 illustrates another example of a standard cubic curve 410 compared to a modified cubic interpolation curve 420. The standard cubic curve 410 and the modified cubic interpolation curve 420 pass through pixels 430, 440, 450 and 460. The standard cubic curve 410 has undershoot beyond the scale given for the pixels and therefore is subject to clipping. For example, between pixels 440 and 450, the standard cubic curve 410 is clipped.

To generate the modified cubic interpolation curve 420 between the pixels 430 and 440 an interpolation slope is determined for both the pixels 440 and 450. To determine the interpolation slope at pixels 440 and 450, the four pixels 430, 440, 450, and 460 are used. An interpolation slope for the pixel 440, initially the target pixel, is determined using the pixel 430 as a proceeding pixel and the pixel 450 as the following pixel. An interpolation slope for the pixel 450, now the target pixel, is determined using the pixel 440 as a proceeding pixel and the pixel 460 as the following pixel. Thus, the interpolation slopes of the pixels 440 and 450 are determined with respect to one another. Because the pixels 440 and 450 have the same amplitude, the interpolation slope is selected to be zero to reduce undershoot and eliminate clipping.

Figure 5:
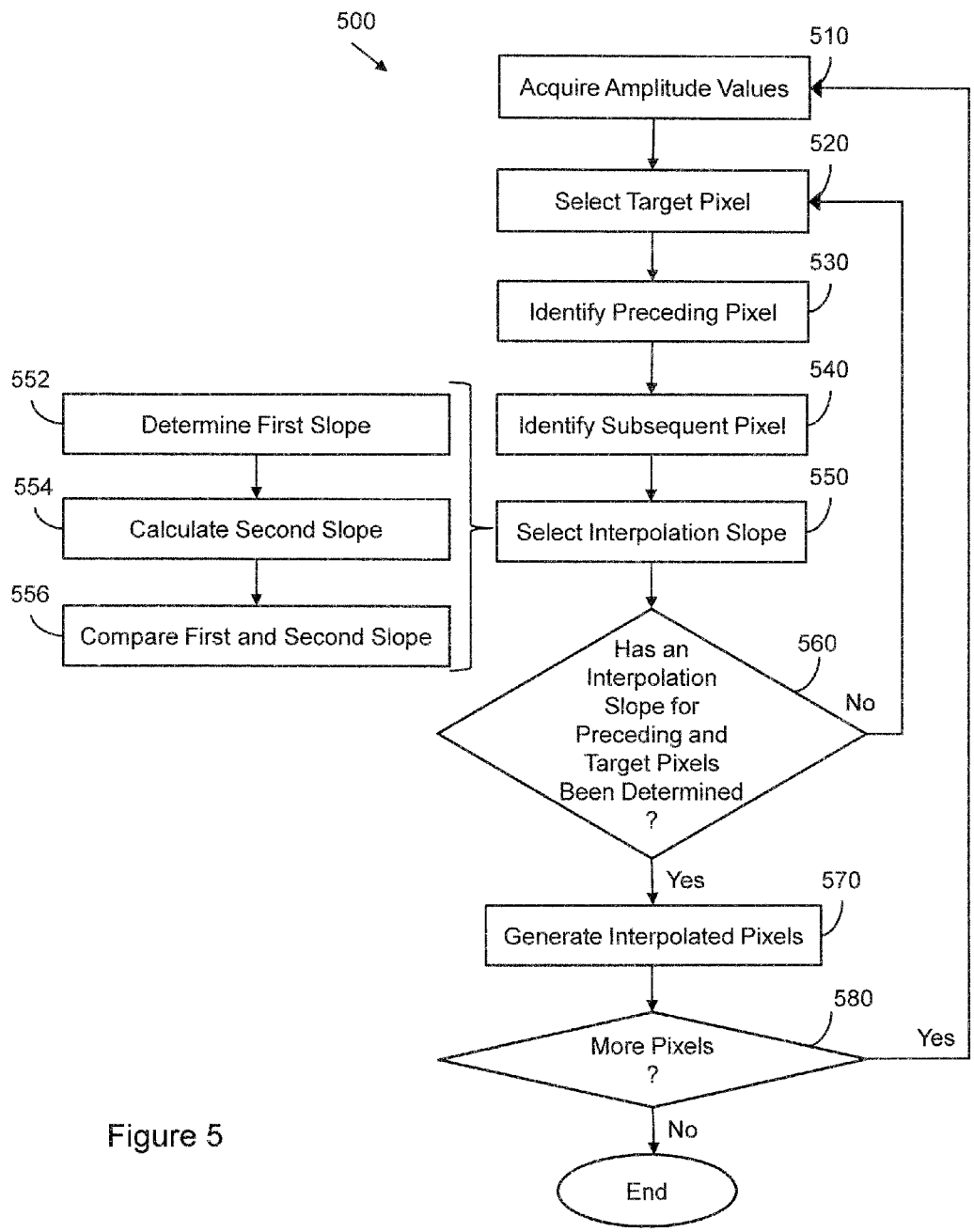
FIG. 5 illustrates one embodiment of a method associated with interpolation having reduced overshoot and undershoot.

FIG. 5 illustrates one embodiment of a method associated with modified bicubic interpolation. At 510, amplitude values describing pixels existing in an image to be scaled up are acquired. The amplitude values describe a characteristic (e.g., color intensity) of the pixels. The amplitude values may be stored in a memory. Image scaling may then be performed on the image by adding additional pixels that should have smooth transitions to avoid severe changes in a scaled up image.

At 520, a target pixel is chosen from the set of pixels in the image. Once a target pixel is identified, a preceding pixel that is next to the target pixel is identified at 530. At 540, a subsequent pixel that is next to the target pixel is identified. At 550, an interpolation slope for the target pixel is selected. During this selection, at 552, a first slope between the preceding pixel and the target pixel is determined. In a first iteration of the method 500 the first slope is calculated. In subsequent iterations, the first slope may be the second slope from a prior iteration that has been stored. At 554, a second slope between the target pixel and the subsequent pixel is calculated.

The first slope and the second slope are then compared at 556. The slopes are compared to determine if the first slope and the second slope have the same sign. If the slopes have different signs, the interpolation slope is selected at 550 to be substantially zero. If the slopes have the same sign, the absolute value of a scaled version of the first slope, a scaled version of the second slope, and the standard bicubic slope are compared at 556. Based on the comparison at 556, the smaller of the slopes is selected as the interpolation slope at 550.

At 560, a determination is made whether an interpolation slope has been determined for both the preceding pixel and the target pixel. If an interpolation slope has not been selected for the preceding pixel and the target pixel, a next target pixel is selected at 520. If an interpolation slope has been selected for all pixels in the image, the method moves to 570.

At 570, interpolated pixels are generated along an interpolation curve between the preceding pixel and the target pixel. The interpolated pixels have the selected interpolation slopes at the preceding pixel and the target pixel. The interpolated pixels are added between the preceding pixel and the target pixel when the image is enlarged. The interpolated pixels vary in amplitude gradually from the preceding pixel to the target pixel so that the enlarged image will have smooth transitions between the pixels while reducing overshoot and undershoot. At 580, a determination is made whether more pixels are available for interpolation. If more pixels are available, the amplitude values of those pixels are acquired. If no more pixels are available the method ends. In this manner, a modified interpolation slope can be determined at existing pixels in the image to generate a modified interpolation curve.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A method, comprising:
acquiring a plurality of amplitude values respectively describing a set of pixels in an image; and
performing image scaling on the image by:
identifying a first pixel from the set of pixels;
identifying a second pixel from set of pixels, wherein the second pixel precedes the first pixel in the set of pixels;
defining a range of amplitude values between an amplitude value of the second pixel and an amplitude value of the first pixel;
determining when interpolation between the second pixel and first pixel will result in an interpolated pixel having an interpolated amplitude value outside of the range of amplitude values;
based on the determination, selecting an interpolation slope for the first pixel from (i) a first slope determined between the second pixel and the first pixel or (ii) a second slope determined between the first pixel and a third pixel wherein the third pixel is adjacent to and follows the first pixel in the set of pixels; and
generating a set of interpolated pixels between the second pixel and the first pixel along a curve defining amplitude values of the interpolated pixels based, at least in part, on the selected interpolation slope, wherein the curve has the selected interpolation slope at the first pixel.

2. The method of claim 1, further comprising selecting an interpolation slope of substantially zero when the interpolated amplitude value is determined to be outside of the range of amplitude values.

3. The method of claim 1, wherein determining when interpolation between the second pixel and first pixel will result in an interpolated pixel outside the range of amplitude values comprises:
determining the first slope between the second pixel and the first pixel;
identifying the third pixel to the first pixel;
determining the second slope between the first pixel and the third pixel;
comparing a first sign of the first slope to a second sign of the second slope; and
when the first slope and the second slope have different signs, determining that the interpolated amplitude value is outside of the range of amplitude values.

4. The method of claim 1, wherein when the interpolated amplitude value is not outside of the range of amplitude values:
determining the first slope between the second pixel and the first pixel;
determining the second slope between the first pixel and the third pixel; and
selecting the interpolation slope from the first slope, the second slope, or an average of the first slope and the second slope.

5. The method of claim 4, wherein selecting the interpolation slope comprises selecting the interpolation slope based, at least in part, on relative magnitudes of the first slope, the second slope, and the average of the first slope and the second slope.

6. The method of claim 4, further comprising applying a scaling factor to the first and second slopes prior to selecting the interpolation slope.

7. The method of claim 1, wherein the interpolation is cubic interpolation or bicubic interpolation.

8. An apparatus, comprising:
an acquisition logic configured to acquire a plurality of amplitude values describing a set of pixels in an image; and
a scaling logic configured to perform image scaling on the image, comprising:
an overshoot logic configured to (i) identify a first pixel and a second pixel, wherein the second pixel precedes the first pixel in the set of pixels and (ii) determine if interpolation between the second pixel and first pixel will result in an interpolated pixel having an interpolated amplitude value outside of a range of amplitude values between the second pixel and the first pixel;
a slope selection logic configured to select an interpolation slope at the first pixel for a curve that defines amplitudes of a set of interpolated pixels, wherein the interpolation slope is selected from (i) a first slope determined between the second pixel and the first pixel or (ii) a second slope determined between the first pixel and a third pixel that is adjacent the first pixel; and
a rendering logic configured to render the set of interpolated pixels between the second pixel and the first pixel using the interpolation slope at the first pixel.

9. The apparatus of claim 8, wherein when the interpolated amplitude value is outside of the range of amplitude values, the interpolation slope is selected to be substantially zero.

10. The apparatus of claim 8, wherein the overshoot logic is configured to:
determine the first slope between the second pixel and the first pixel;
determine the second slope between the first pixel and the third pixel;
compare a first sign of the first slope to a second sign of the second slope; and
when the first slope and the second slope have different signs, determine that the interpolated amplitude value is outside the range of amplitude values.

11. The apparatus of claim 8, wherein the slope selection logic is configured to select the interpolation slope from the first slope, the second slope, and an average of the first slope and the second slope when the interpolated amplitude value is not outside of the range of amplitude values.

12. The apparatus of claim 8, wherein the slope selection logic is configured to apply a scaling factor to the first and second slopes prior to selecting the interpolation slope.

13. The apparatus of claim 8, wherein the slope selection logic is configured to select the interpolation slope based, at least in part, on relative magnitudes of the first slope, the second slope, and an average of the first slope and the second slope.

14. The apparatus of claim 8, wherein the rendering logic is configured to perform cubic interpolation or bicubic interpolation.

15. The apparatus of claim 8, wherein the slope selection logic is configured to select the interpolation slope to limit an angle of rise or an angle of drop in the curve.

16. A method, comprising:
identifying a first pixel in an image to be scaled up;
identifying a second pixel from the first pixel, wherein the second pixel precedes the first pixel in the image;
identifying a third pixel from the first pixel, wherein the third pixel is adjacent to and follows the first pixel in the image;
determining a first slope between the second pixel and the first pixel;
determining a second slope between the first pixel and the third pixel;

selecting an interpolation slope based, at least in part, on the first slope and the second slope, wherein the selected interpolation slope is substantially zero when the first slope and the second slope have different signs;

defining an interpolation curve having the selected interpolation slope at the first pixel; and generating a set of interpolated pixels between the second pixel and the third pixel along the interpolation curve.

17. The method of claim 16, further comprising selecting the interpolation slope corresponding to one of the first slope, the second slope, and an average of the first slope and the second slope when the first slope and second slope have a same sign.

18. The method of claim 17, further comprising applying a scaling factor to the first and second slopes prior to selecting the interpolation slope.

19. The method of claim 17, wherein selecting the interpolation slope is based, at least in part, on relative magnitudes of the first slope, the second slope, and the average of the first slope and the second slope.

20. The method of claim 16, further comprising determining if additional pixels are available for interpolation, and in the event the additional pixels are available, acquiring amplitude values for the additional pixels to identify an additional pixel as an additional first pixel.

\* \* \* \* \*